United States Patent
Ewing et al.

(10) Patent No.: US 7,259,946 B2
(45) Date of Patent: Aug. 21, 2007

(54) INTEGRATED ELECTRIC MOTOR AND CONTROL SYSTEM AND METHOD

(75) Inventors: William Alan Ewing, Madison, IN (US); Michael David Swinney, Columbus, IN (US)

(73) Assignee: Reliance Electrical Technologies, LLC, Mayfield Heights, OH (US)

( * ) Notice: Subject to any disclaimer, the term of this patent is extended or adjusted under 35 U.S.C. 154(b) by 287 days.

(21) Appl. No.: 10/955,734

(22) Filed: Sep. 30, 2004

(65) Prior Publication Data

US 2006/0067020 A1    Mar. 30, 2006

(51) Int. Cl.
*H02H 5/04* (2006.01)
(52) U.S. Cl. ....................................... 361/24
(58) Field of Classification Search ................. 361/24; 310/89, 71, 98
See application file for complete search history.

(56) References Cited

U.S. PATENT DOCUMENTS

| | | | | |
|---|---|---|---|---|
| 3,159,768 A | * | 12/1964 | Flanagan | .................. 361/106 |
| 3,656,023 A | * | 4/1972 | Hadfield | ...................... 361/26 |
| 5,636,731 A | * | 6/1997 | Schaefer | ..................... 200/293 |
| 5,791,456 A | * | 8/1998 | Schaefer | ..................... 200/293 |
| 5,884,006 A | * | 3/1999 | Frohlich et al. | ............ 392/339 |

* cited by examiner

*Primary Examiner*—Stephen W. Jackson
*Assistant Examiner*—Boris Benenson
(74) *Attorney, Agent, or Firm*—Thompson Coburn LLP

(57) ABSTRACT

An electrically and thermally protected electrical machine is disclosed. The electrical and thermal protection is provided by one or more control components placed in a conduit box of the electrical machine to disrupt power transmission to the electrical machine upon an excessive current or temperature occurrence. Other control components may also be added to the system to provide further current or thermal protection. These additional control components may or may not be located within the conduit box. A method for providing thermal and current protection, and an aftermarket kit for adding such protection, to an electrical machine are also disclosed.

11 Claims, 5 Drawing Sheets

INTEGRATED ELECTRIC MOTOR AND CONTROL SYSTEM AND METHOD

BACKGROUND

The invention relates generally to electric motors, and more specifically, to a technique for providing thermal and current control to an electric motor.

Rotating machines, such as electric motors, generators, and other similar devices, are quite common and may be found in diverse industrial, commercial, and consumer settings. These machines are produced in a variety of mechanical and electrical configurations. The configuration of these devices may depend upon the intended application, the operating environment, the available power source, or other similar factors. In general, these devices include a rotor surrounded at least partially by a stator.

For instance, one common design of electrical motor is the induction motor, which is used in numerous and diverse applications. Induction motors typically employ a stator assembly including a slotted core in which groups of coil windings are installed. By providing alternating current power to certain windings at certain times, a dynamic magnetic field is produced that causes the rotor to rotate within the stator. The rotational speed of the rotor is a function of the frequency of the alternating current power input and of the motor design (i.e. the number of poles defined by the windings). This rotation may be used to transmit a mechanical force to a driven load via an output shaft coupled between the rotor and the driven load.

Electric motors and other similar devices are generally configured to operate in a given temperature range. During operation, conventional motors typically generate heat. Indeed, physical interaction of the various moving components may produce heat by way of friction. Additionally, the electric current passing through the coil windings in the stator and rotor also produces heat, by way of resistive heating, for example. Similarly, electric motors and other similar devices are also intended to receive electrical current within a given range. If left unchecked, excessive heat or current may impair the performance of the motor. Worse yet, this excess heat or current may contribute to any number of malfunctions or system failure, which often leads to system downtime and required maintenance. Such events are undesirable because they impair productivity and lead to increased operating costs of such systems.

A number of devices are known in the art for protecting machines, such as electric motors, from excessive temperature or current. These control components include such devices as circuit breakers, fuses, switches, protective relays, thermal protectors, thermostats, and the like. Typically, these components are mounted on a wall, or in some enclosure, such as a motor control center, that is remote from the motor. While these devices may address some of the problems associated with excessive heat and current, the location of these devices remote from the motor can be problematic. In particular, remote placement of these devices does not allow for easy remote control of the motor. Further, such a location requires additional wiring when installing devices and longer downtime when a system malfunctions, resulting in significant installation and operating costs as well as lower productivity. In short, in most cases, such arrangements impose costs both of the additional components, wiring, enclosures, conduit and so forth, along with associated costs of installation.

There is a need, therefore, for an improved method for providing current and thermal protection to a rotating machine, such as an electric motor. There is a particular need for a method of protecting a motor in a fashion that requires less expense, while allowing for quicker repair and improved remote control of the motor.

BRIEF DESCRIPTION

The present invention provides a novel technique for providing thermal and current protection to an electric system comprising a rotating machine. The technique makes use of a control component for providing such protection. The control component is placed within a conduit box of the rotating machine and is electrically interposed between the rotating machine and a power source. The control component may comprise one or more devices, such as a protective relay, a thermal overload protector, a thermostat, a fuse, a circuit breaker, or some other device useful in providing thermal or current protection to an electrical system.

An aftermarket kit for providing thermal or current protection to a rotating machine is also provided by the present techniques. The kit may include one or more control components for placement within a conduit box of the rotating machine, wherein at least one control component is adapted for electrical connection between the rotating machine and an associated power supply. The kit may also include one or more mounting devices to assist in mounting of a control component within the conduit box of the rotating machine. The kit may, in fact, include a replacement conduit box configured to house the control component, along with the internal component or components, ready to install electrically between the machine and a power supply.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
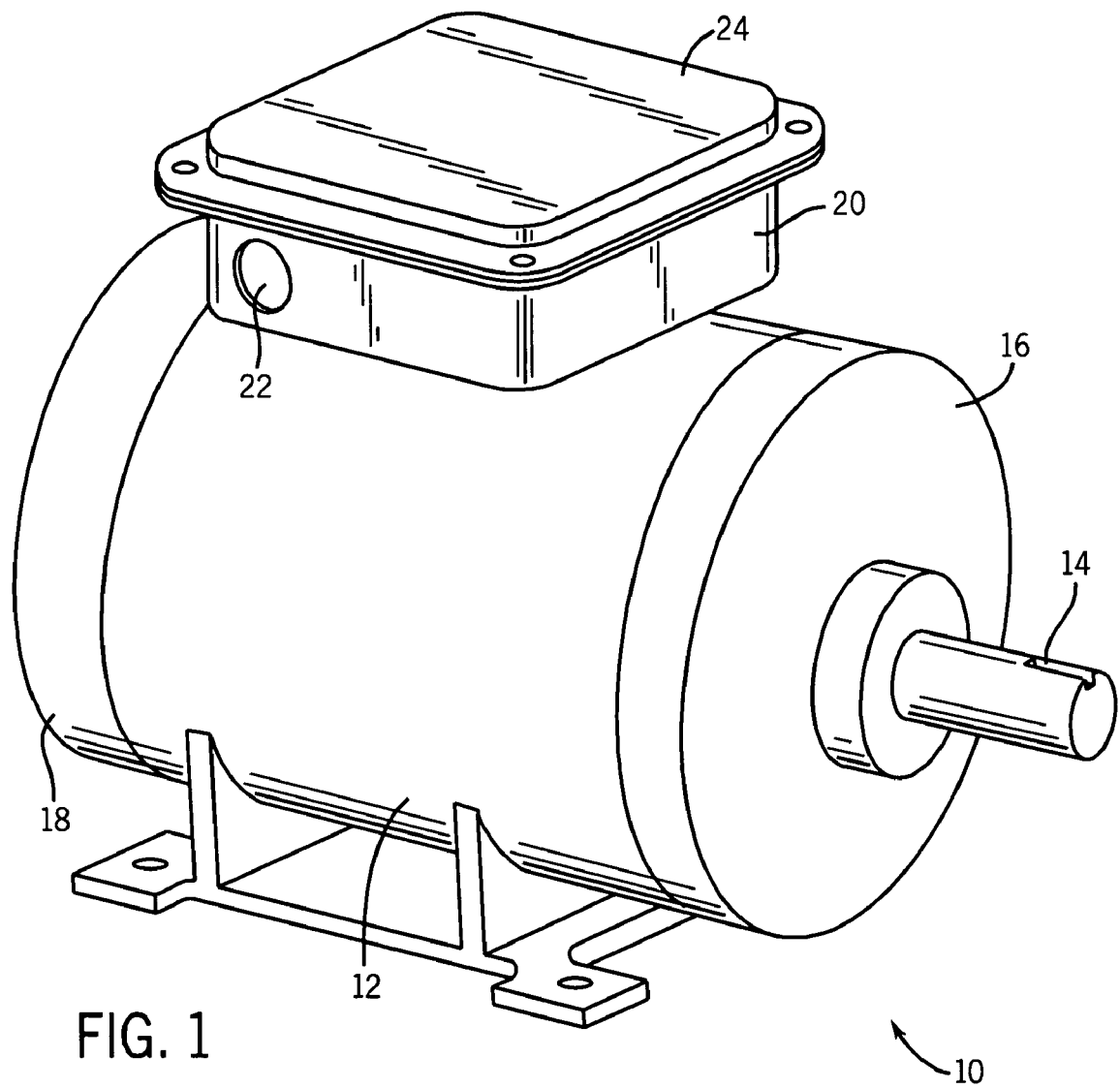
FIG. 1 is a perspective view of an exemplary electric motor and attached conduit box, in accordance with certain aspects of the invention.

Turning now to the drawings, and referring first to FIG. 1, an electric motor is shown and designated generally by the reference numeral 10. In the embodiment illustrated in FIG. 1, motor 10 is an induction motor housed in a conventional enclosure. Accordingly, motor 10 includes a frame 12 and an output shaft 14. Frame 12 is open at front and rear ends and capped by a front end cap 16 and a rear end cap 18. Frame 12, front end cap 16, and rear end cap 18 form a protective shell, or housing, for internal components of the motor, such as a stator, stator windings, and a rotor. The rotor and shaft 14 may be supported for rotation within frame 12 by a front bearing set and a rear bearing set carried by front end cap 16 and rear end cap 18, respectively. Motor 10 may also include a cooling fan within frame 12 or end caps 16 and 18 to promote convective heat transfer through the frame. Frame 12 generally includes features permitting it to be mounted in a desired application, such as mounting bracket or integral mounting feet.

Stator windings are electrically interconnected to form groups, and the groups are, in turn, interconnected in a manner generally known in the art. The windings are further coupled to terminal leads (shown generally in FIG. 2). The terminal leads are used to electrically connect the stator windings to an external power source, such as power source 30 of FIG. 2. Energizing the stator windings produces a changing magnetic field that induces rotation of the rotor and the shaft 14, which is coupled to the rotor. As will be appreciated by those skilled in the art, the shaft 14 is configured for coupling to a driven machine element (not shown), for transmitting torque to the machine element.

Electrical connections between the terminal leads and the power source, as well as various other components described below with respect to FIGS. 2-5, may be housed within a conduit box 20. Electrical leads, such as those from an external power source or control device, may pass through aperture 22 of conduit box 20 to permit various electrical connections, such as connections to internal components of conduit box 20 and to the terminal leads of FIG. 2. A conduit box lid 24 is also provided to allow easy access to the electrical connections and internal control components of conduit box 20, thereby facilitating efficient repair, replacement, and modification of the components and connections within conduit box 20.

As will be appreciated by those skilled in the art, while reference is made herein to a specific motor design, many different types of machines and motors may employ control components and protection methods based upon the present techniques. For example, many different motor frame sizes, ratings and styles may benefit from the protection methods disclosed herein. Similarly, motors operating on different electrical principles may receive the control components, including induction motors, synchronous motors, and so forth. Also, application of the control components discussed below is not limited to three-phase motors. Other types of rotating machines and motors, such as single phase motors, may also benefit from the addition of thermal or current protection and, as such, may employ control components in accordance with the principles set forth herein.

An exemplary system for electrically and thermally protecting a motor is discussed below and best illustrated in FIG. 2. In the present illustration, motor 10 is configured to accept three-phase power from a power supply 30. Specifically, power is provided to motor terminals T1, T2, and T3 of the motor from power leads L1, L2, and L3, respectively, of the power supply. Though motor 10 of the presently illustrated embodiment is configured for three-phase power, the current techniques are equally applicable to any motor, or any rotating machine, such as single phase motors, direct current motors, generators, and so forth.

Figure 2:
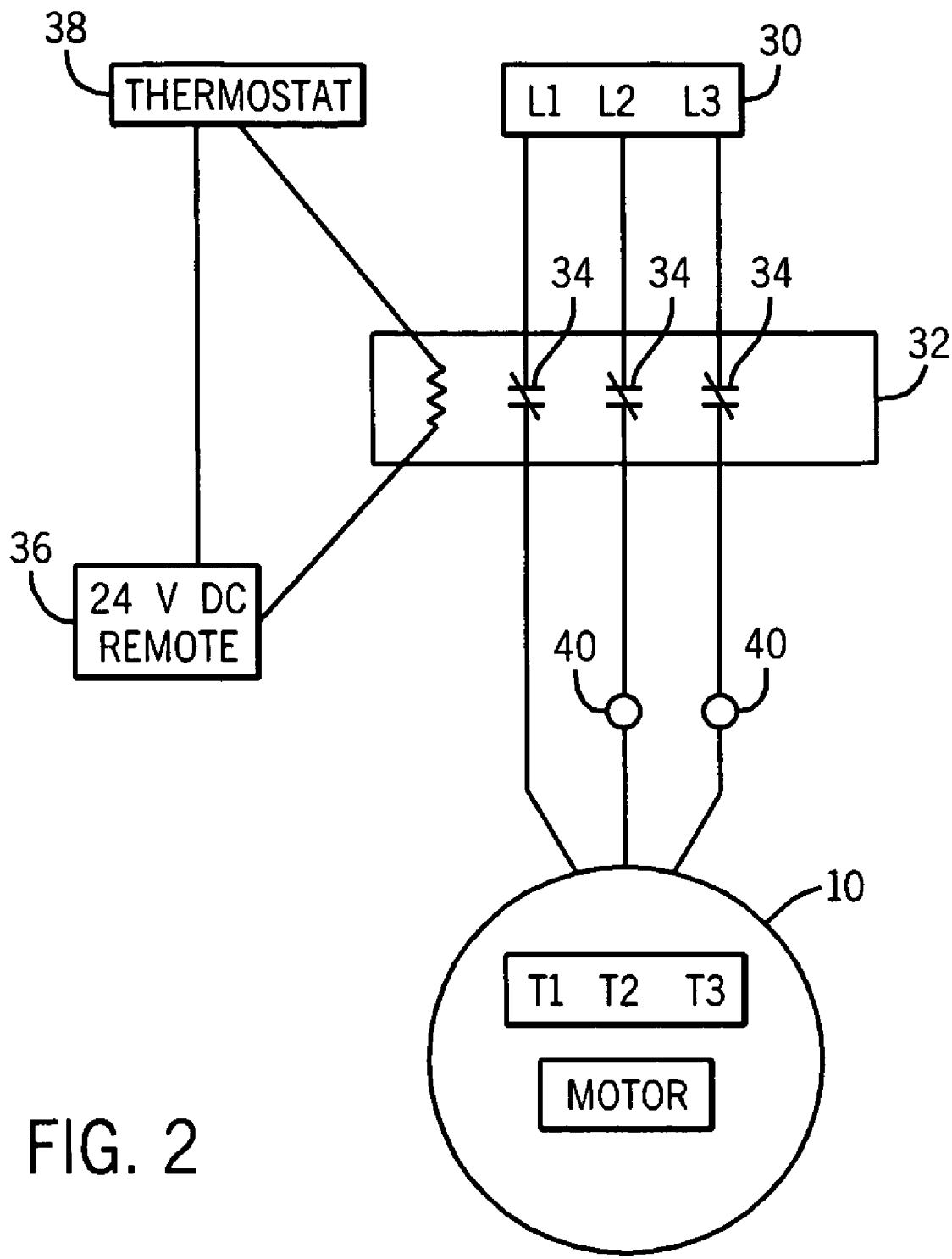
FIG. 2 is a partial schematic illustrating control components that may provide thermal and electrical protection to a motor in accordance with certain aspects of the invention.

Several control components are also provided in the embodiment depicted in FIG. 2, which provide running and locked-rotor protection to motor 10. For instance, a contactor or protective relay 32 may be provided, comprising one or more contact sets 34, and powered by a relay power supply 36. In the present three-phase power design, power is routed from power supply 30 to motor 10, through protective relay 32. The protective relay is powered by relay power supply 36 and is configured to interrupt power transmission to the motor, via one or more contact sets 34, upon some triggering event, such as a current or thermal overload. In the present diagram, relay power supply 36 is depicted as a 24-volt direct current remote power source, though the relay power supply may be of another configuration, such as 115-volt alternating current, if desired for a particular implementation. As will be appreciated by those skilled in the art, the power supply is generally switched to power a coil within the relay to open or close the contact sets, depending upon whether the relay is wired in a normally open or normally closed configuration.

Another control component, a thermostat 38, is shown connected in series with protective relay 32. Thermostat 38 may be configured to physically open the circuit comprising protective relay 32 and relay power supply 36 (e.g., interrupt power to the relay coil) when excessive temperature is detected. This opening of the circuit deactivates the protective relay, consequently opening the contacts of the relay and preventing power transmission to the motor. Alternatively, thermostat 38 may be configured to monitor the temperature and send an electronic signal indicating an excessive temperature to some other device or system, such as a computer system, that may de-energize the protective relay 32, causing the motor to power down. This control circuit, comprising protective relay 32, relay power source 36, and thermostat 38, may be configured to automatically reactivate upon cessation of the harmful thermal (i.e., via natural cooling) or electrical condition, or may be configured for a manual reset which may be accomplished remotely or locally at the motor, depending on the system configuration. Once reactivated, the circuit allows power to through the protective relay to the motor, permitting operation of the motor to resume.

Further control components, thermal overload protectors 40, are also provided. In the current embodiment of a three-phase power system, a thermal overload protector 40 is coupled to two of the three power transmission lines to motor 10. The thermal overload protectors 40 may be disc-type bimetallic devices, or may be some other type of devices. In general, thermal overload protectors 40 sense and respond to overheating conditions by breaking the connection between the power supply and the motor. More particularly, in the case of a thermal overload protector 40 comprising a bimetallic device, which may or may not be a disc-type device, the thermal overload protector comprises two metals coupled together which are heated as current passes through the device. As the temperature increases, the different metals of such a device expand at different rates, causing the coupled metals to bend. The bimetallic device is configured such that when the temperature of the device exceeds a certain point, the bending of the metals causes separation of contacts within the device, breaking the circuit to which it is attached.

In the present embodiment, if an excessive temperature were present in the two thermal overload protectors 40, the thermal protectors would disconnect power from terminals T2 and T3 of motor 10, thereby powering down the motor in such an occurrence. Once activated, thermal overload protectors 40 may be reset to reconnect power to the motor. Such resetting may be accomplished manually or automatically depending on the configuration of the thermal overload protector. Additional control components not shown in the present illustration may also be incorporated, and may include devices such as thermal fuses, circuit breakers, or the like.

Figure 3:
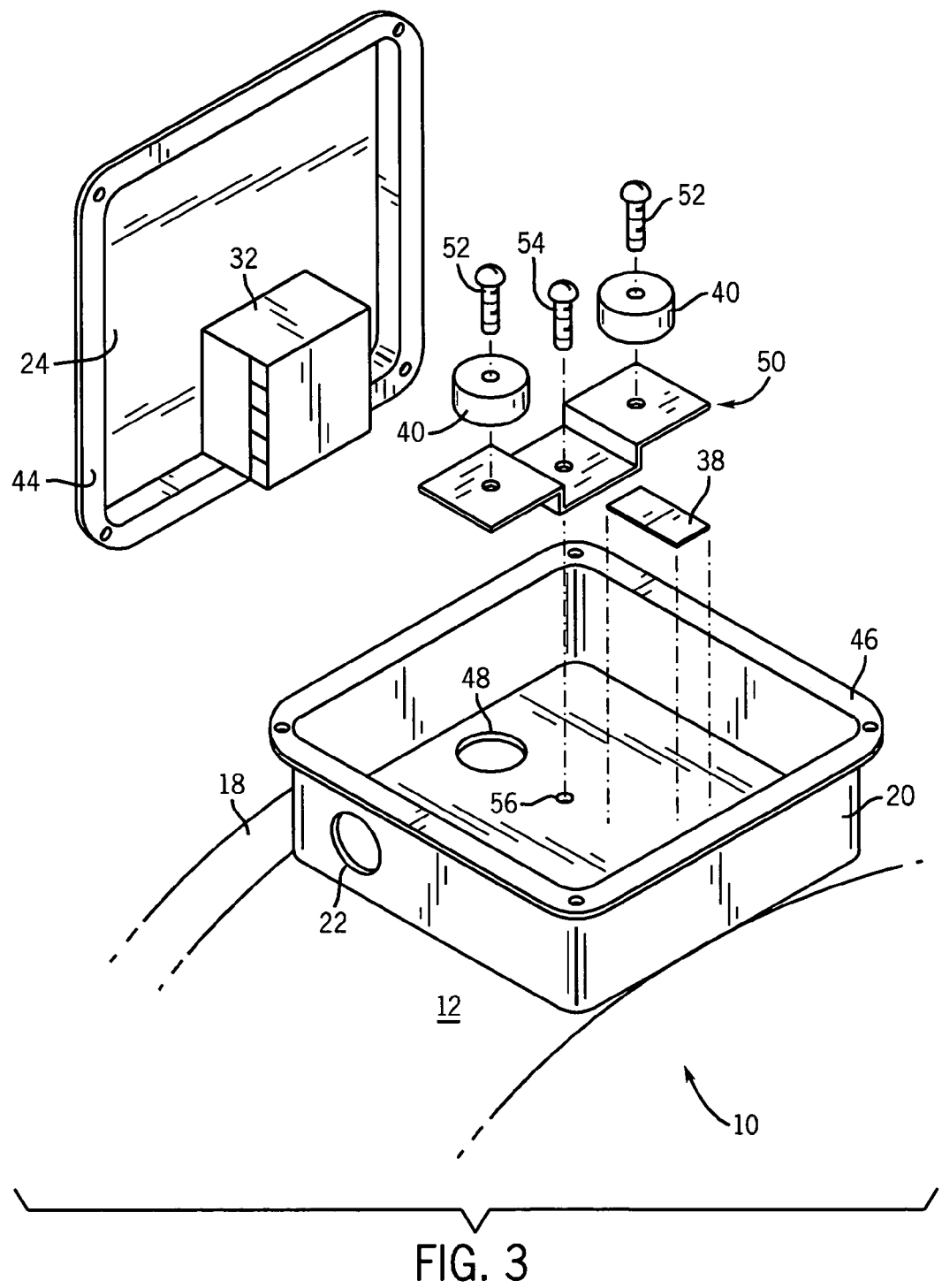
FIG. 3 is an exploded view of the exemplary conduit box of FIG. 1, depicting various exemplary control components that may provide electrical and thermal protection to a motor in accordance with certain aspects of the present technique.
Figure 4:
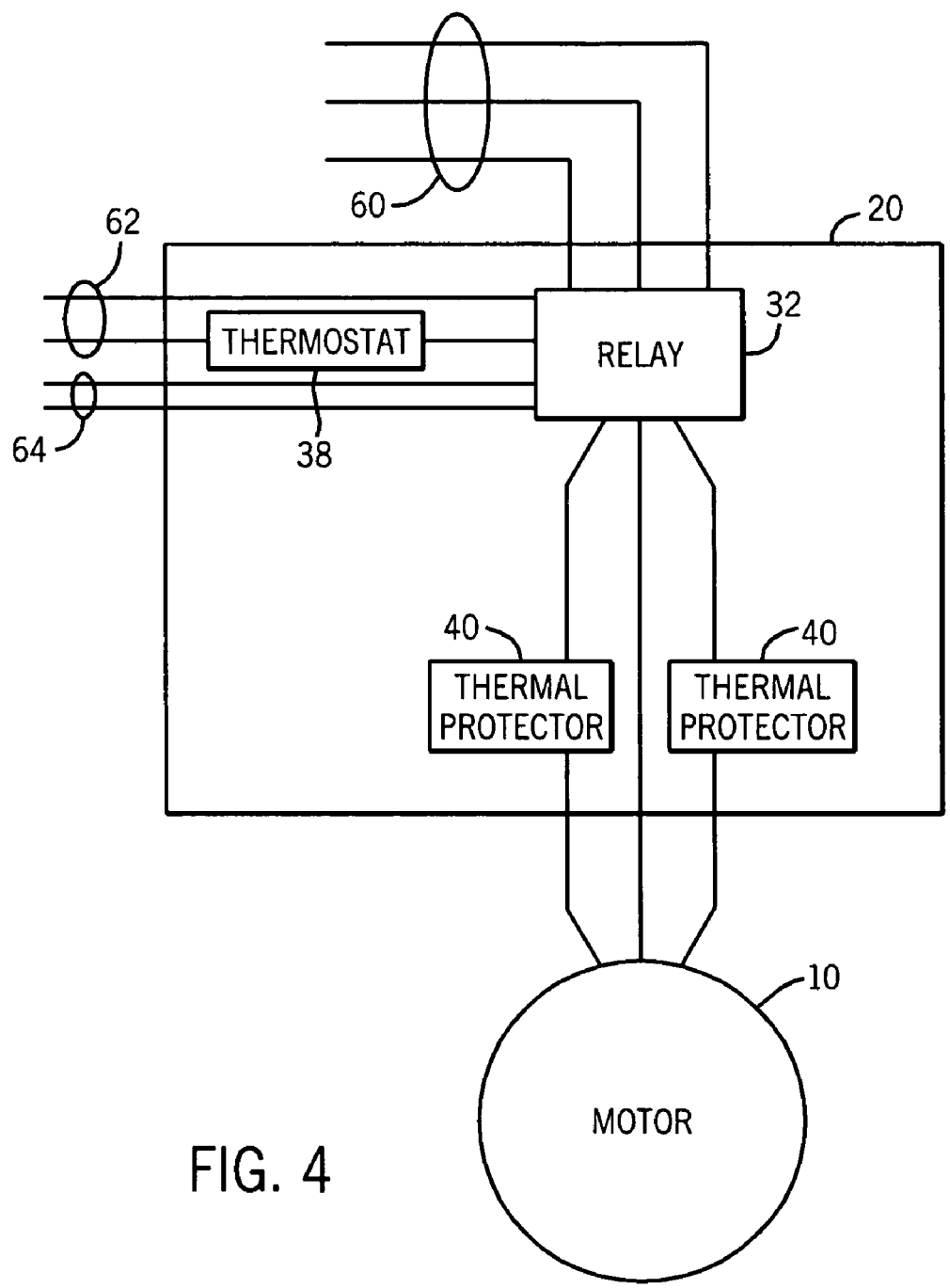
FIG. 4 is a partial schematic showing the connections of the various exemplary electric devices and components of FIG. 3.

In an exemplary embodiment, several of the control components discussed above may be positioned within conduit box 20 as best illustrated in FIG. 3. As in FIG. 1, conduit box 20 is coupled to motor 10, which comprises frame 12 and rear end cap 18 as discussed above. Conduit box 20 includes an aperture 22, to allow various external electrical lines to enter the conduit box. Conduit box lid 24 may comprise a peripheral flange 44, corresponding to a complimentary flange 46 of conduit box 20, to assist in fastening the lid to the conduit box. Conduit box 20 also includes a second aperture 48, through which power may be transmitted to motor 10.

In this exemplary embodiment, protective relay 32, thermostat 38, and thermal overload protectors 40 are provided within conduit box 20 to add thermal and current protection to motor 10. Placement of one or more of these control components in the conduit box, instead of at a remote location, results in a system that requires less wiring and allows shorter average repair time, resulting in higher efficiency and productivity at a lower cost. In certain applications, where repair of the motor or protective circuitry is desired, the entire assembly, considered as a modular unit, may simply be withdrawn from service and replaced.

In the present illustration, protective relay 32 is mounted on conduit box lid 24, while thermal overload protectors 40 may be mounted on a retaining bracket 50 for securing the thermal protectors within the conduit box. In particular, thermal overload protectors 40 may be attached to bracket 50 via fastening screws 52, or may be coupled to the bracket in some other fashion. The bracket itself may be mounted within the conduit box using a stator pin 54, which is inserted in a stator pin aperture 56 and screws into a complimentary surface of frame 12 of the motor.

It is important to note that while the protection afforded the motor by these control components may be provided by the manufacturer before use of the motor, the presently disclosed techniques may also be used to retrofit existing motors, either prior to installation and commissioning, or after the motor is already in service. To this end, one or more control components, such as thermal overload protectors, protective relays, thermostats, fuses, circuit breakers, and the like, may be provided in an aftermarket kit form to add thermal and/or current protection to a motor. Such a kit may also include one or more mounting devices for these components, such as screws, a bracket for mounting thermal overload protectors, or a replacement conduit box lid adapted for mounting a control component, such as a protective relay, to the lid. Further, such a kit may comprise control components that have already been mounted to an associated mounting device, such as a protective relay coupled to a replacement conduit box lid or one or more thermal overload protectors coupled to a bracket. Where additional space is needed for housing the components, the kit may include an entire replacement conduit box which may replace an existing box on a standard frame motor.

An electrical schematic demonstrating various electrical connections between the motor and exemplary control components discussed above are illustrated in FIG. 4. As mentioned above, the current exemplary embodiment comprises a motor 10 configured to receive three-phase power from a power supply. As will be understood in the art, the number of power transmission lines 60 may vary depending on the electrical configuration of the motor. In the present embodiment, three power transmission lines 60, each delivering single phase of the three-phase power, enter conduit box 20 and are coupled to protective relay 32. Power is supplied to the protective relay via relay power lines 62. As discussed above, thermostat 38 may also be included in the circuit comprising relay power lines 62 and the protective relay.

When the temperature detected by thermostat 38 exceeds a desired limit electrical power to the relay is interrupted, opening the contacts of the protective relay, which, in turn, interrupts power transmission to the motor. Auxiliary signal lines 64, and a corresponding internal or external auxiliary switch, may also be provided to the protective relay for a variety of purposes, such as monitoring operation of, or sending a signal to, the relay or circuitry in series with the auxiliary switch. Also shown are two thermal overload protectors 40 connected to two legs of the three-phase power provided to the motor. As discussed above, these thermal protectors react to the heat created by the current flowing through the devices, preventing power transmission through the devices once the devices reach a certain temperature. Also as discussed above, these thermal protectors may be capable of resetting themselves automatically, may be reset remotely, or may have a manual reset button for the device. In certain applications a reset button for this purpose may be provided in either the conduit box lid or the box wall, permitting resetting manually locally at the motor without the need to open the conduit box.

Figure 5:
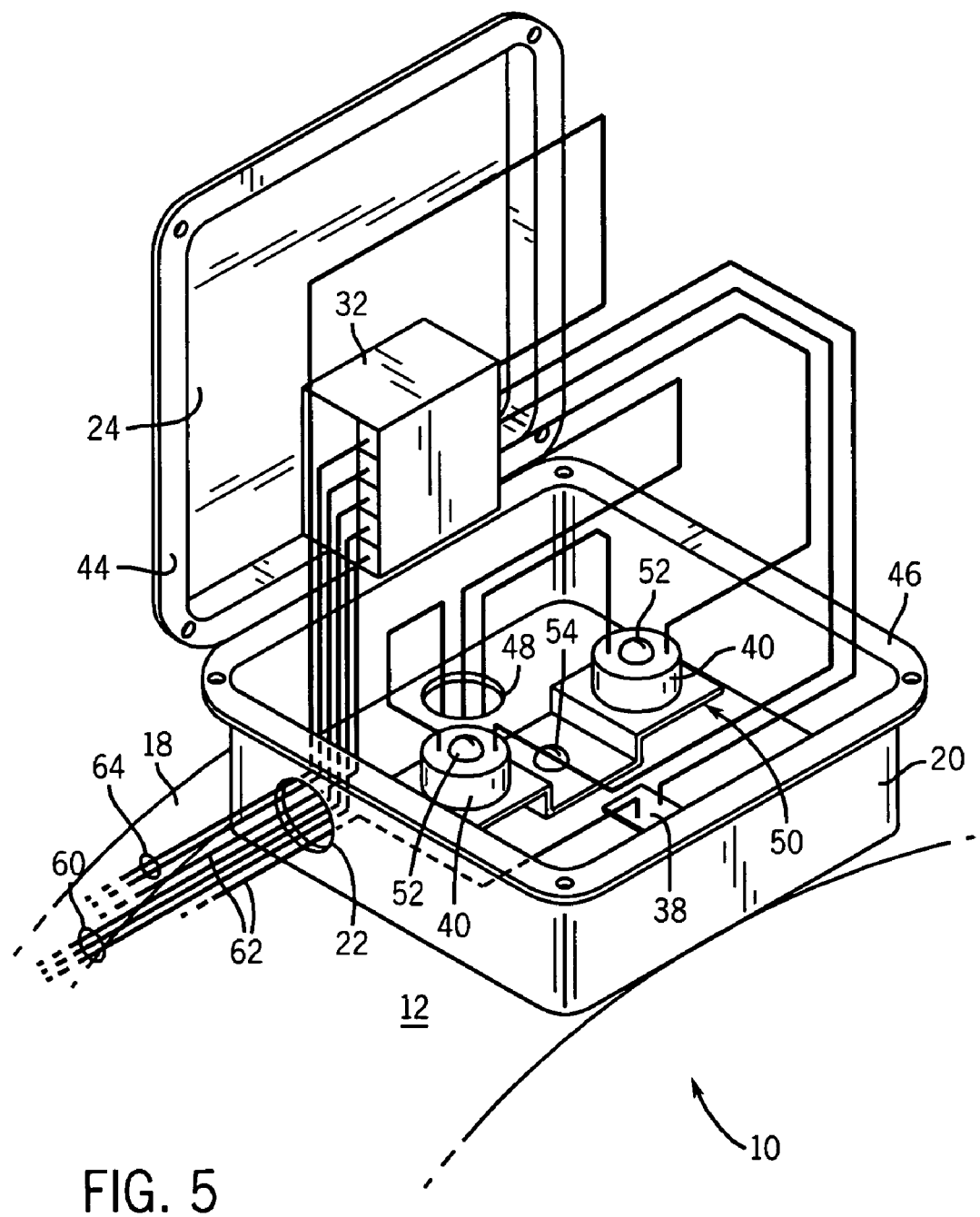
FIG. 5 is a perspective view of the exemplary conduit box of FIG. 1 showing various exemplary control components positioned within the conduit box and the electrical connections between these various components and the motor.

An exemplary conduit box, with the control components and electrical connections described above with respect to FIG. 4, are illustrated in FIG. 5. Three-phase power transmission lines 60, relay power lines 62, and auxiliary signal lines 64 may enter the conduit box through aperture 22 for connection to the control components as in the fashion described above. One phase of the three-phase power is supplied to motor 10 through aperture 48 via a transmission line passing directly from protective relay 32 to the motor, while the other two phases are routed through thermal overload protectors 40 before being transmitted to the motor via two other lines passing through aperture 48.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A kit for adding protection to a rotating machine, the kit comprising: a control component, wherein the control component is adapted for electrical connection between a rotating machine and a power source and for completion and interruption of current from the power source to the machine; and a mounting device for holding the control component within a conduit box of a rotating machine;
   wherein the control component comprises a thermal protector; and
   further comprising, a protective relay; and
   further comprising a replacement lid for a conduit box, wherein the protective relay is mounted to the replacement lid.

2. The kit of claim 1, wherein the mounting device comprises a bracket.

3. The kit of claim 1, further comprising a thermostat.

4. The kit of claim 1, further comprising a fuse.

5. The kit of claim 1, further comprising a second thermal protector.

6. A kit for adding protection to a rotating machine, the kit comprising: a control component, wherein the control component is adapted for electrical connection between a rotating machine and a power source and for completion and interruption of current from the power source to the machine; and a mounting device for holding the control component within a conduit box of a rotating machine;
- wherein the control component comprises a protective relay;
- wherein the mounting device comprises a replacement lid for a conduit box, the replacement lid being configured for coupling of the protective relay to the replacement lid.

7. The kit of claim 6, further comprising a thermostat.

8. The kit of claim 6, further comprising a fuse.

9. The kit of claim 6, further comprising a thermal protector.

10. The kit of claim 9, further comprising a bracket configured to allow mounting of the thermal protector to the bracket.

11. The kit of claim 10, further comprising a second thermal protector.

* * * * *